United States Patent Office 3,663,537
Patented May 16, 1972

3,633,537
LIGHT-FAST AND WASH-FAST REACTIVE
PHTHALOCYANINE DYES
Hirohito Kenmochi, Toyonaka-shi, Seiji Hotta, Minoo-shi, and Takashi Akamatsu, Ashiya-shi, Japan, assignors to Sumitomo Chemical Company, Ltd., Osaka, Japan
No Drawing. Continuation-in-part of application Ser. No. 561,064, June 28, 1966. This application Nov. 10, 1969, Ser. No. 875,566
Claims priority, application Japan, July 1, 1965, 40/39,475; June 11, 1966, 41/37,945
Int. Cl. C07d 27/76
U.S. Cl. 260—239.6                14 Claims

ABSTRACT OF THE DISCLOSURE

Light-fast and wash-fast reactive phthalocyanine dyes which are free from metal or contain metal represented by the following general formula,

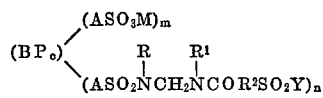

or

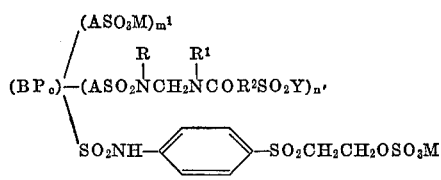

wherein $P_c$ means the residue of phthalocyanine; B represents 2H or a divalent metal in the center of the phthalocyanine molecule; A means direct linkage or a bisvalent radical selected from the group consisting of

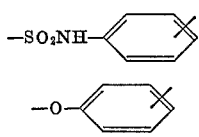

and

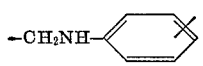

(the benzene ring may be substituted with methyl or methoxy radical); R means hydrogen atom, an alkyl radical having 1 to 4 carbon atoms of β-sulfatoethyl radical; $R^1$ means hydrogen atom or an alkyl radical having 1 or 2 carbon atoms; $R^2$ means an alkylene radical having 1 or 2 carbon atoms; Y means β-sulfatoethyl or vinyl radical; M means hydrogen atom or an alkali metal; m and n means respectively a number of 1 to 3, provided that the total number of m and n is 2 to 4; and m' and n' mean respectively a number of 1 to 2, provided that the total number of m' and n' is 2 to 3.

CROSS-REFERENCE TO RELATED APPLICATION

This application is a continuation-in-part of U.S. Ser. No. 561,064 filed on June 28, 1966 now abandoned.

This invention relates to new phthalocyanine dyes, which are particularly suitable for direct dyeing nitrogen-containing natural and synthetic fibers and which are exceptionally fast to light and washing.

More specifically, this invention relates to new phthalocyanine dyes having a phthalocyanine residue of the types

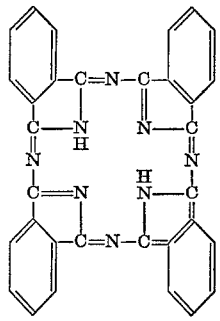

and

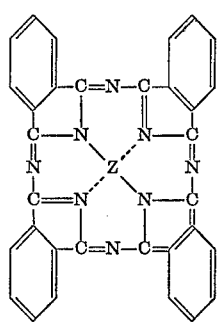

wherein Z is hydrogen or, collectively, a divalent metal such as copper, nickel, cobalt and the like, and which contain at least one reactive group represented by the following general formula,

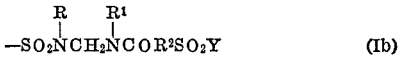

wherein R means hydrogen atom, an alkyl radical having 1 to 4 carbon atoms, an alkyl radical having 2 to 4 carbon atoms or a β-sulfatoethyl radical, $R^1$ means hydrogen atom or an alkyl radical having 1 to 2 carbon atoms, $R^2$ means an alkylene radical having 1 to 2 carbon atoms and Y means β-sulfatoethyl or vinyl radical. It relates also to a process for manufacturing the same which comprises contacting a phthalocyanine derivative having at least one radical having the formula,

wherein R has the same meanings as defined above, with at least one molar ratio of a reactive compound represented by the following formula,

wherein X means hydroxy radical or a halogen atom and $R^1$ and $R^2$ have the same meanings defined above, in sulfuric acid medium, and if desired, treating the resulting product with an alkali.

Methods for producing reactive dyes containing the group represented by the formula

or

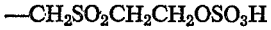

and methods for dyeing fibers and fabrics therewith are disclosed in prior publications including U.S. Pat. No. 2,657,205 (1953) and U.S. Pat. No. 2,670,265 (1954) to Farbwerke Hoechst Aktiengesellschaft and British Pat. No. 917,104 (1963) to General Aniline & Film Corporation.

However, the manufacture of these dyes is not yet satisfactory due to the necessity for expensive raw materials such as nitrosulfinic acid derivatives, phenylvinyl sulfide or phenyl β-hydroxyethyl sulfide derivatives, or benzyl β-hydroxyethyl sulfide derivatives, along with an extremely complex operating procedure, as the reactive group cannot be introduced directly into the common dyes. In addition, the yields are unsatisfactory.

A method for producing certain phthalocyanine dyes containing the group mentioned above has, moreover, disclosed in Japanese patent publication No. 5,033/63 to Farbwerke Hoechst Aktiengesellschaft. However, the resulting product is not acceptable for dyeing nitrogen-containing fibers such as wool, silk and synthesized polyamide fibers.

These problems, accordingly, have seriously hampered the commercial production and use of such dyestuffs.

It has now been discovered that when a phthalocyanine derivative containing at least one sulfonamide radical having a hydrogen atom which can be substituted is reacted with at least one mol ratio of a reactive compound represented by the Formula II, there can readily be obtained new phthalocyanine dyes represented by the formula

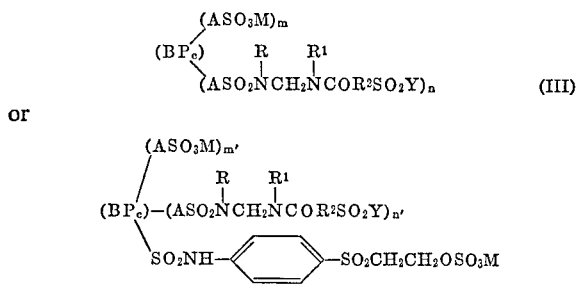

or

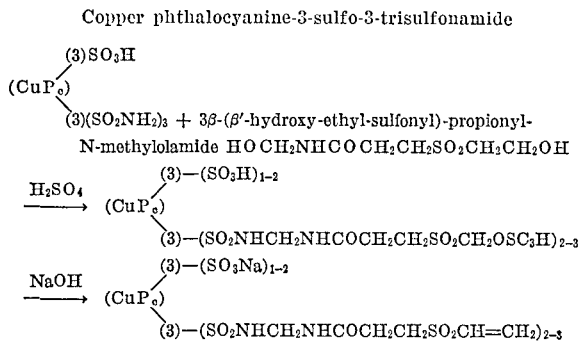

wherein A, B, R, R$^1$, R$^2$, Y, M, P$_c$, $m$ and $n$ and $m'$ and $n'$ have the meanings set forth above.

The production of these new reactive dyes proceeds according to the amidomethylation reaction and may be represented as follows:

Copper phthalocyanine-3-sulfo-3-trisulfonamide (CuP$_c$)$\diagdown$(3)SO$_3$H
(3)(SO$_2$NH$_2$)$_3$ + 3β-(β'-hydroxy-ethyl-sulfonyl)-propionyl-
N-methylolamide HOCH$_2$NHCOCH$_2$CH$_2$SO$_2$CH$_2$CH$_2$OH $\xrightarrow{H_2SO_4}$ (CuP$_c$)$\diagdown$(3)—(SO$_3$H)$_{1-2}$
(3)—(SO$_2$NHCH$_2$NHCOCH$_2$CH$_2$SO$_2$CH$_2$OSC$_3$H)$_{2-3}$ $\xrightarrow{NaOH}$ (CuP$_c$)$\diagdown$(3)—(SO$_3$Na)$_{1-2}$
(3)—(SO$_2$NHCH$_2$NHCOCH$_2$CH$_2$SO$_2$CH=CH$_2$)$_{2-3}$ The amidomethylation reaction proceeds rapidly and substantially stoichiometrically in concentrated sulfuric acid and, theoretically, three molecules of the reactive group should be introduced into the phthalocyanine dye. However there is a slight but determinable hydrolysis so that, as a practical matter, the final product is a mixture of compounds, one having two introduced reactive groups and the other three such reactive groups in the molecule. For this reason the number of the sulfo groups in the above product is indicated as "1–2" and the number of reactive groups as "2–3", with the understanding that the total will be 4.

These products are suitable for dyeing various fiber articles such as wool, silk, synthesized polyamide fibers and cotton which dyed articles are extremely resistant to fading by light and washing.

Thus, one object of the present invention is to provide new phthalocyanine dyes which are more useful for dyeing nitrogen-containing fibers, i.e., wool, silk and synthesized polyamide fibers and also polyhydroxy fibers such as cotton and regenerated cellulose, as compared with the known dyes.

A further object of the invention is the provision of a commercially acceptable process for making such reactive dyes.

Still another object of the invention is the provision of suitable procedures for dyeing fiber articles with these novel dyestuffs.

These and other objects of the present invention will be apparent from the following detailed description.

In carrying out the present invention, the phthalocyanine derivatives containing metal such as copper, nickel, cobalt and the like in the molecule may be employed, provided, as an essential condition, that they have at least one sulfonamide radical as defined above, which is directly attached to the nucleus of the said phthalocyanine dye, or which may be bound thereto through a bisvalent radical such as

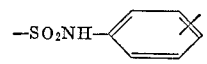

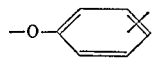

and

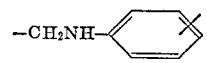

(the benzene nucleus may be further substituted with methyl and/or methoxy radical). Preferably, the phthalocyanine dyes may be those which have at least one sulfo radical. Moreover, they may include other groups such as β-hydroxyethylsulfonyl radical and the like.

The following phthalocyanine derivatives are representative of those employed in practicing the present invention:

phthalocyanine-3-sulfo-3-trisulfonamide
phthalocyanine-3-sulfo-3-trisulfo-N-ethylamide
phthalocyanine-3-sulfo-3-disulfo-N-methylamide-3-sulfonamide
phthalocyanine-3-trisulfo-3-sulfo-N-n-butylamide
phthalocyanine-3-sulfo-3-trisulfo-N-(β-hydroxyethyl) amide
phthalocyanine-3-sulfo-3-disulfo-N-ethylamide-3-sulfo-N-(β-hydroxyethyl)amide
phthalocyanine-3-sulfo-3-disulfo-N-methylamide
phthalocyanine-3-disulfo-3-disulfo-N-ethylamide
phthalocyanine-3-sulfo-3-disulfo-N-(4'-sulfamoylphenyl)-amide-3-sulfo-N-(4'-sulfophenyl)amide
phthalocyanine-3-disulfo-N-(4'-methoxy-2' or 3'-sulfamoylphenyl(amide-3-disulfo-N-(4'-methoxy-2' or 3'-sulfophenyl)amide
phthalocyanine-3-disulfo-N-(4'-methyl-2'- or 3'-sulfamoylphenyl)amide-3-sulfo-N-(4'-methyl-2' or 3'-sulfophenyl)amide
phthalocyanine-3-sulfoamide-3-sulfo-N-(4'-sulfamoylphenyl)amide-3-sulfo-N-(4'-sulfophenyl)amide
phthalocyanine-3-sulfo-3-disulfo-N-ethylamide-3-sulfo-N-[4'-(β-hydroxyethylsulfonyl(phenyl]amide
phthalocyanine-4-disulfo-4-disulfonamide
4-di(4'-sulfamoylphenoxy)-4-di(4'-sulfophenoxy)-phthalocyanine
3-di(4'-sulfamoylphenyl) aminomethyl phthalocyanine.

Such derivatives include also their metal-containing forms.

The reactive compounds represented by the Formula II moreover can be synthesized on a commercial scale without complex procedures and at relatively low costs.

Thus, for example, β-(β'-hydroxyethyl-sufonyl) propionyl-N-methylolamide,

is easily prepared with high yield by, first, oxidation of β-(β'-hydroxyethylmercapto) propionitrile with hydrogen peroxide, secondly, hydrolysis of the resulting product with alkaline hydrogen peroxide to produce β-(β'-hydroxyethylsulfonyl) propionylamide, followed by successive methylolation in an alkaline aqueous solution with aqueous formaldehyde solution, thereby to obtain the objective compound. Alternatively, this compound may be prepared by first, oxidation of β-(β'-hydroxyethylmercapto) propionylamide with hydrogen peroxide and secondly, methylolation of the resulting oxidation product.

N-halomethylamide may be prepared readily and advantageously by treatment of the corresponding acid amide with a symmetrical bishalomethyl ether in sulfuric acid medium.

In this case, the resulting product in sulfuric acid may be employed as it is in the reaction with any phthalocyanine derivatives as mentioned above.

The reactive compound represented by the general Formula II is mixed with the phthalocyanine derivatives mentioned above in a sulfuric acid medium of various concentration from 80% to a fuming sulfuric acid having comparatively low $SO_3$ concentration preferably in nearly 100% sulfuric acid, the amount of the compound being 1 to 4 moles per mole of the said phthalocyanine derivatives. The reaction is maintained at room temperature for from several hours up to several days, as necessary to complete the same.

After the reaction is over, the reaction mixture is poured into ice water and, if appropriate, subjected to salting out with an inorganic salt such as sodium chloride or potassium chloride, in order to separate the desired reactive phthalocyanine product.

The resulting compound containing at least one reactive group represented by the general formula,

wherein R, $R^1$ and $R^2$ have the same meanings defined above and M means hydrogen atom or an alkali metal, can be easily converted to the compound containing at least one relative group represented by the general formula,

wherein R, $R^1$ and $R^2$ have the same meanings defined above, by the weak alkali treatment in an aqueous medium at room temperature. More concretely, as the alkaline material, sodium hydroxide, sodium carbonate, trisodium phosphate and sodium bicarbonate may be employed. The conversion can be effected simply by adding the alkaline material mentioned above into an aqueous solution of the said compound to adjust the pH of the solution in the range of 8 to 9 and then stirring the solution for a short period of time, heating being unnecessary.

Prior separation and recovery of the reactive compound is not always required and in some instances the reaction mixture as such can be utilized directly for the preparation of the reactive dyestuff. For instance, as mentioned above, N-halomethylamide solution in sulfuric acid, prepared by mixing the corresponding acid amide with a symmetrical bishalomethyl ether may be directly mixed with the phthalocyanine derivatives.

Indeed in this case, the nitrile from which the said acid amide can be produced in sulfuric acid medium, may be directly mixed with the said phthalocyanine derivatives in the presence of bishalomethyl ether to obtain the final dye product.

The thus-obtained new phthalocyanine dyes possess a brilliant blue to green shade in water and can be employed for dyeing nitrogen-containing fibers such as wool, silk and synthesized polyamide fibers and also polyhydroxy fibers such as cotton and regenerated cellulose with extremely good fastness to light and washing.

Typical procedures for dyeing with these novel dyestuffs will now be described.

First, a suitable process for dyeing nitrogen-containing fiber articles is as follows.

The dyeing is conducted at a liquid ratio of from 1:20 to 1:100 at a temperature of from 50° to 100° C., preferably of from 70° to 100° C., using as an auxiliary agent those materials usually employed for the dyeing of nitrogen-containing fiber articles for the purpose of accelerating the absorption of dye, such as ammonium acetate, ammonium sulfate, acetic acid and formic acid.

Nonionic surface active agents containing a nitrogen atom may be added to the bath for the purpose of preventing spots dyeing, so-called skitteriness.

Second, the dyeing of polyhydroxy fiber with the present phthalocyanine dyes may be carried out according to the following description.

An article to be dyed is dipped into an aqueous dye bath containing one of the present phthalocyanine dyes and urea, and the dipped article is squeezed and then dried.

In order to fix the dye to the article, the dried article is treated with a chemical solution containing an acid binding agent, and then steamed or heat-treated, or treated with aqueous sodium silicate solution at a low temperature according to the so-called cold wet fix method.

In addition, dyeing may be performed by the printing method with these new phthalocyanine dyes. More concretely, an article to be dyed is printed with a printing paste of one such dye in a base such as sodium alginate, and the printed article is then treated with an acid binding agent such as sodium hydroxide, sodium carbonate, sodium bicarbonate or the like, followed by dyeing and heat-treatment in the usual way.

In this manner, polyhydroxy fiber articles may be also satisfactorily dyed with desired fastness.

The following examples will further illustrate the invention which, however, is not limited thereto. All parts and percentages are by weight unless otherwise stated.

EXAMPLE 1

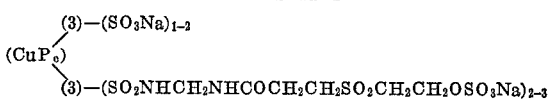

8.9 parts of copper phthalocyanine-3-sulfo-3-trisulfonamide are dissolved in 107 parts of 100% sulfuric acid and 6.3 parts of β-(β'-hydroxyethylsulfonyl)-propionyl-N-methylolamide are added thereto.

The mixture is stirred for 5 hours at a temperature of from 10° to 15° C.

After the reaction is over, the reaction mixture is poured into 500 parts of ice water to precipitate the dye, which is separated by filtration and washed with aqueous 5% sodium chloride solution until the filtrate becomes almost neutral.

The thus-obtained dye has 2 or 3 reactive groups as indicated by the above formula. It is suitable for dyeing wool, synthesized polyamide fibers and cotton a turquoise blue shade which is light- and wash-fast.

EXAMPLE 2

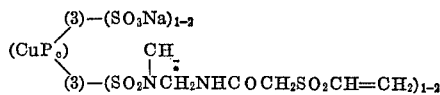

8.4 parts of copper phthalocyanine-3-sulfo-3-disulfo-N-methylamide are dissolved in 101 parts of 100% sulfuric acid and 4.0 parts of β-hydroxyethyl-sulfonylaceto-N-methylolamide are added thereto.

The mixture is stirred for 10 hours at a temperature of from 10° to 15° C.

After the reaction is over, the reaction mixture is poured into 500 parts of ice water to precipitate the dye, which is separated by filtration. The resulting wet cake is suspended in 200 parts of aqueous 5% sodium chloride solution and aqueous 45% sodium hydroxide solution is dropwise added thereto to adjust the pH of the solution to from 8 to 9. The reaction mixture is stirred for 1 hour, thereafter the precipitate is separated by filtration and dried.

The thus-obtained new dye may be employed for dyeing wool, synthesized polyamide fibers and cotton turquoise blue shade with fastness.

EXAMPLE 3

$$(CuP_c) \begin{matrix} (3)-SO_3Na \\ \\ (3)-SO_2NHCH_2\overset{CH_3}{\underset{|}{N}}COCH_2CH_2SO_2CH_2CH_2OSO_3Na \end{matrix}$$

7.3 parts of copper phthalocyanine-3-sulfo-3-sulfonamide are dissolved in 73 parts of 98% sulfuric acid and 2.5 parts of β - (β' - hydroxyethylsulfonyl)-propionyl-N-methyl-N-chloromethylamide are added thereto.

The mixture is stirred for 5 hours at a temperature of from 10° to 15° C.

After the reaction is over, the reaction mixture is poured into 400 parts of ice water to precipitate the dye, which is separated by filtration and washed with aqueous 5% sodium chloride solution until the filtrate becomes almost neutral.

Wool, synthesized polyamide and cotton may be dyed turquoise blue with high fastness.

EXAMPLE 4

$$(CuP_c) \begin{matrix} (3)-(SO_3Na)_{2-3} \\ \\ (3)-(SO_2NHCH_2NHCOCH_2CH_2SO_2CH_2CH_2OSO_3Na)_{1-2} \end{matrix}$$

8.9 parts of copper phthalocyanine-3-disulfo-3-disulfonamide are dissolved in 89 parts of 100% sulfuric acid and the mixture is cooled at temperature of 0° C. 4.3 parts of β-(β'-hydroxyethyl-sulfonyl)propionitrile and 1.5 part of bischloromethyl ether are added thereto during short period of time.

The mixture is, thereafter, stirred for 20 hours at a temperature of from 10° to 15° C.

After the reaction is over, the reaction mixture is poured into 500 parts of ice water containing 25 parts of sodium chloride to precipitate the dye, which is separated by filtration, washed with aqueous 5% sodium chloride solution until the filtrate becomes almost neutral.

Wool, synthesized polyamide fibers and cotton are dyed a turquoise blue with high fastness with this new product.

EXAMPLE 5

$$(CuP_c) \begin{matrix} (3)-(SO_3Na)_{2-3} \\ \\ (3)-(SO_2\overset{C_2H_5}{\underset{|}{N}}CH_2NHCOCH_2CH_2SO_2CH_2CH_2OSO_3Na)_{1-2} \end{matrix}$$

9.5 parts of copper phthalocyanine-3-disulfo-3-disulfo-N-ethylamide are dissolved in 114 parts of 100% sulfuric acid and 4.2 parts of β-(β'-hydroxyethylsulfonyl)-propionyl-N-methylolamide are added thereto.

The mixture is stirred for 5 hours at a temperature of from 10° to 15° C.

After the reaction is over, the reaction mixture is poured into 500 parts of ice water containing 50 parts of sodium chloride to precipitate the dye, which is separated by filtration.

The recovered dye is suspended in small amount of aqueous 20% sodium chloride solution, after which, sodium carbonate is carefully added to the suspension, so as to exactly adjust the pH of the said solution to from 5 to 6. The mixture is subjected to filtration to separate the dye, which is squeezed and dried.

This new dye produces a fast turquoise blue shade on wool and synthesized polyamide fibers.

EXAMPLE 6

$$(NiP_c) \begin{matrix} (3)-(SO_3Na)_{1-2} \\ \\ (3)-(SO_2NHCH_2NHCOCH_2CH_2SO_2CH_2CH_2OSO_3Na)_{2-3} \end{matrix}$$

8.9 parts of nickel phthalocyanine-3-sulfo-3-trisulfonamide instead of 8.9 parts of copper phthalocyanine-3-sulfo-3-trisulfonamide employed in Example 1 are treated according to the same way as in Example 1, thereby to obtain the above dye, which may be employed for dyeing wool, synthesized polyamide fibers and cotton a bluish-green shade with desired fastness.

EXAMPLE 7

$$(CuP_c) \begin{matrix} (3)-\left(SO_2NH-\!\!\left\langle\!\!\bigcirc\!\!\right\rangle\!\!-SO_3Na\right)_{1-2} \\ \\ (3)-\left(SO_2NH-\!\!\left\langle\!\!\bigcirc\!\!\right\rangle\!\!-SO_2NHCH_2NHCOCH_2CH_2SO_2CH_2CH_2OSO_3Na\right)_{2-3} \end{matrix}$$

15.1 parts of copper phthalocyanine-3-trisulfo-N-(4'-sulfamoylphenyl)amide - 3 - sulfo - N - (4'-sulfophenyl)-amide are treated according to the procedure of Example 1, thereby to obtain the above indicated new compound which dyes wool, synthesized polyamide fibers and cotton a turquoise blue shade with good fastness.

EXAMPLE 8

$$(CuP_c) \begin{matrix} (3)-(SO_3Na)_{1-2} \\ \\ (3)-(SO_2NHCH_2\overset{C_2H_5}{\underset{|}{N}}COCH_2CH_2SO_2CH_2CH_2OSO_3Na)_{2-3} \end{matrix}$$

8.9 parts of copper phthalocyanine-3-sulfo-3-trisulfonamide are subjected to the reaction with 7.2 parts of β-(β'-hydroxyethylsulfonyl)propionyl - N - ethyl - N-methylolamide according to the procedure of Example 1, thereby to obtain the above new dye, which produces on wool, synthesized polyamide fibers and cotton a fast turquoise blue shade.

EXAMPLE 9

$$(CuP_c) \begin{matrix} (4)-\left(O-\!\!\left\langle\!\!\bigcirc\!\!\right\rangle\!\!-SO_3Na\right)_2 \\ \\ (4)-\left(O-\!\!\left\langle\!\!\bigcirc\!\!\right\rangle\!\!-SO_2NHCH_2NHCOCH_2CH_2SO_2CH_2CH_2OSO_3Na\right)_2 \end{matrix}$$

12.6 parts of 4-di(4'-sulfamoyl-phenoxy)-4-di(4'-sulfophenoxy) copper phthalocyanine are treated according to the procedure in Example 1, thereby producing the new dye represented by the above formula, which produces on wool, synthesized polyamide fibers and cotton a bluish-green fast color.

EXAMPLE 10

$$(CuP_c) \begin{matrix} (3)-(SO_3Na)_{2-3} \\ \\ (3)-\left(SO_2N\begin{matrix}CH_2CH_2OSO_3Na\\ \\CH_2NHCOCH_2CH_2SO_2CH_2CH_2OSO_3Na\end{matrix}\right)_{1-2} \end{matrix}$$

9.8 parts of copper phthalocyanine-3-disulfo-3-disulfo-N-(β-hydroxyethyl)amide instead of the copper phthalocyanine-3-disulfo-3-disulfo-N-ethylamide employed in Example 5, are treated according to the same process as in Example 5, thereby to obtain new dye, which may be employed for dyeing wool, synthesized polyamide fibers and cotton a turquoise blue shade with fastness.

EXAMPLE 11

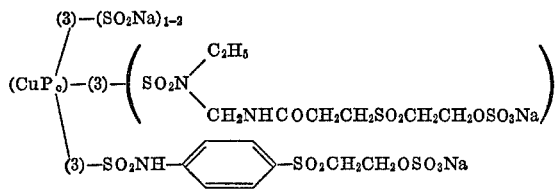

11.3 parts of copper phthalocyamine-3-disulfo-3-disulfo-N-ethylamide-3-sulfo - N - [4'-(β-hydroxyethylsulfonyl)phenyl] amide instead of 9.5 parts of copper phthalocyanine-3-disulfo-3-disulfo - N - ethylamide are treated according to the process of Example 5, thereby to obtain the new dye, represented by the above formula, which dyes wool, synthesized polyamide fibers and cotton a good fast shade of turquoise blue.

EXAMPLE 12

10 parts of wool are dipped in 200 parts of the dyeing bath containing 0.2 part of the new dye obtained in Example 1, 0.1 part of acetic acid and 0.1 part of a non-ionic surface active agent containing nitrogen atom and heated up to temperature of 95° C.

The temperature is kept at that level for 1 hour during which 0.1 part of formic acid is added to the bath.

Finally, the wool is rinsed in water and dried.

Thus, one obtains turquoise blue wool having excellent wash-fastness.

Using the dye obtained in Example 5 instead of that of Example 1, turquoise blue wool is also obtained.

EXAMPLE 13

2 parts of the dye obtained in Example 2 are dissolved in solution consisting of 4 parts of urea and 40 parts of hot water and the resulting solution is added to 40 parts of a paste containing 5% sodium alginate. After cooling, 10 parts of aqueous 20% sodium carbonate solution is successively added thereto.

The thus-prepared paste is printed on cotton cloth, dried and then subjected to steaming. The cotton cloth is rinsed, subjected to soaping and dried.

A turquoise blue printed cotton cloth having good fastness is obtained.

By the same procedure but using the dye obtained in Example 6, there is obtained a good fast bluish-green shade on the printed fabric.

EXAMPLE 14

1 part of the dye obtained in Example 4 is dissolved in a mixture consisting of 50 parts of water and 5 parts of urea, and cotton cloth is impregnated with the resulting solution. After drying the impregnated cotton cloth is impregnated with a solution prepared by dissolving 10 parts of sodium hydroxide and 300 parts of sodium chloride in 1000 parts of water and squeezed to remove excess liquor.

The thus-impregnated cotton cloth is subjected to steaming for 5 minutes, rinsed in water, subjected to soaping and dried. A turquoise blue cotton cloth having good fastness is obtained.

Following the same procedure but using the dye obtained in Example 11 instead of that of Example 4, a good fast turquoise blue article is also obtained.

EXAMPLE 15

1 part of the dye obtained in Example 1 is dissolved in the mixture consisting of 50 parts of water and 5 parts of urea.

Cotton cloth is impregnated with the prepared solution and dried. The impregnated cotton cloth is impregnated with aqueous sodium silicate solution and squeezed to remove excess liquor.

After standing for 5 hours, the cotton cloth is rinsed, subjected to soaping and dried. A reddish turquoise blue cotton cloth having good fastness is obtained.

It should be understood, of course, that the foregoing description relates to preferred embodiments of the invention and that various modifications or alterations may be made therein by persons skilled in the art without departing from the spirit and scope of the invention as set forth in the appended claims.

What is claimed is:

1. A phthalocyanine dye having the formula,

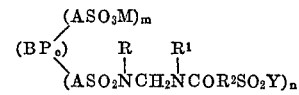

or

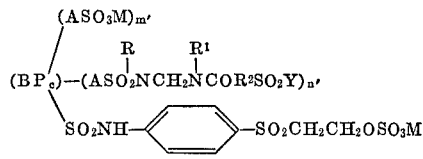

wherein $P_c$ means a phthalocyanine residue, B means 2H or copper or nickel, A means direct linkage or a bivalent radical selected from the group consisting of

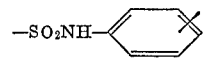

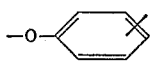

and

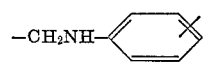

in which the benzene ring may be substituted with methyl or methoxy radical; R means hydrogen atom, an alkyl radical having 1 to 4 carbon atoms or β-sulfatoethyl radical; $R^1$ means hydrogen atom or an alkyl radical having 1 or 2 carbon atoms; $R^2$ means an alkylene radical having 1 or 2 carbon atoms; Y means β-sulfatoethyl or vinyl radical; M means hydrogen atom or an alkali metal; m and n means respectively a number of 1 to 3, provided that the total number of m and n is 2 to 4; and m' and n' means respectively a number of 1 to 2, provided that the total number of m' and n' is 2 to 3, all substituents being located in 3- or 4-position of the phthalocyanine nucleus.

2. A phthalocyanine dye according to claim 1 having the formula,

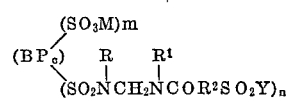

wherein $P_c$, R, $R^1$, $R^2$, M, Y, m and n have the same meaning as in claim 1 and B is copper or nickel, all substituents being located in 3- or 4-position of the phthalocyanine nucleus.

3. A phthalocyanine dye according to claim 1 having the formula,

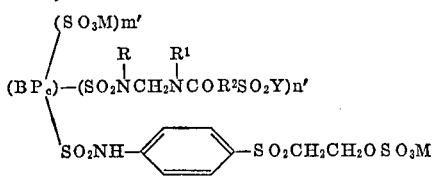

wherein $P_c$, R, $R^1$, $R^2$ M, Y, $m'$ and $n'$ have the same meaning as in claim 1 and B is copper or nickel, all substituents being located in 3- or 4-position of the phthalocyanine nucleus.

4. A phthalocyanine dye according to claim 1 having the formula,

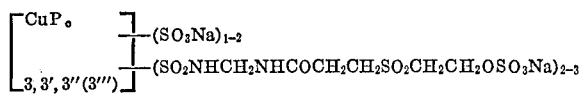

5. A phthalocyanine dye according to claim 1 having the formula,

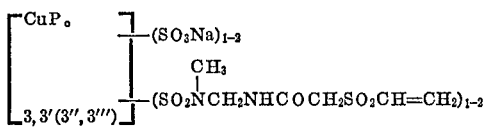

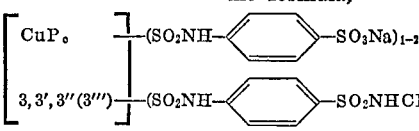

6. A phthalocyanine dye according to claim 1 having the formula,

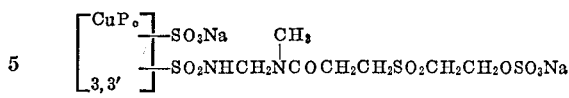

7. A phthalocyanine dye according to claim 1 having the formula,

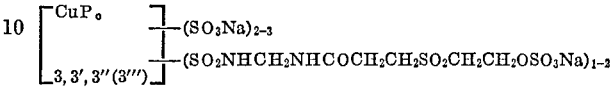

8. A phthalocyanine dye according to claim 1 having the formula,

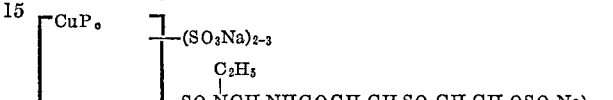

9. A phthalocyanine dye according to claim 1 having the formula,

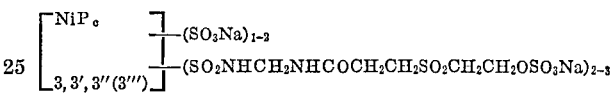

10. A phthalocyanine dye according to claim 1 having the formula,

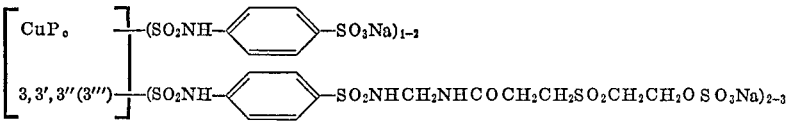

11. A phthalocyanine dye according to claim 1 having the formula,

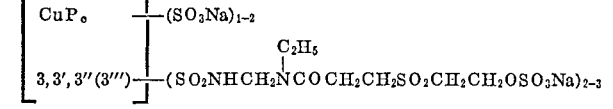

12. A phthalocyanine dye according to claim 1 having the formula,

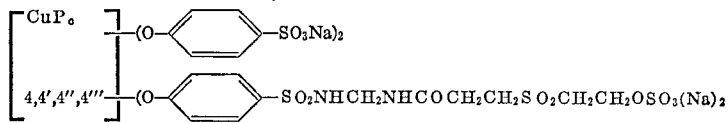

13. A phthalocyanine dye according to claim 1 having the formula,

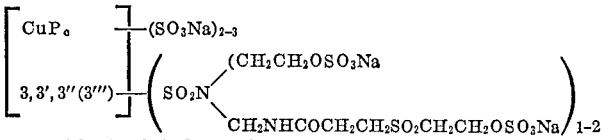

14. A phthalocyanine dye according to claic 1 having the formula,

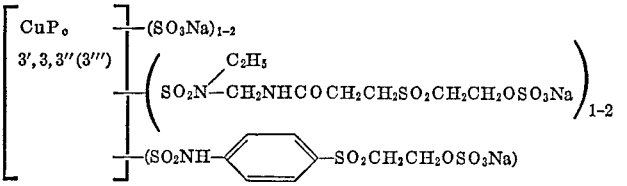

References Cited
UNITED STATES PATENTS 3,232,931   2/1966   Rothman _____ 260—314.5
3,535,333   10/1970   Rudolf et al. _____ 260—314.5

HENRY R. JILES, Primary Examiner
S. D. WINTERS, Assistant Examiner

U.S. Cl. X.R.

8—1 XA, 54, 54.2, 178 R; 260—314.5, 561 S, 465.6